United States Patent [19]

Horikawa

[11] Patent Number: 4,757,199

[45] Date of Patent: Jul. 12, 1988

[54] IMAGE SCANNING READ-OUT METHOD

[75] Inventor: Kazuo Horikawa, Kanagawa, Japan

[73] Assignee: Fuji Photo Film Co., Ltd., Kanagawa, Japan

[21] Appl. No.: 9,002

[22] Filed: Jan. 28, 1987

Related U.S. Application Data

[63] Continuation of Ser. No. 657,638, Oct. 4, 1984, abandoned.

[30] Foreign Application Priority Data

Oct. 19, 1983 [JP] Japan .................................. 58-195455

[51] Int. Cl.[4] ................................................ G03C 5/16
[52] U.S. Cl. .................................. 250/327.2; 250/354.1
[58] Field of Search ................... 250/207, 327.2, 484.1, 250/354.1

[56] References Cited

U.S. PATENT DOCUMENTS

| 4,266,123 | 5/1981 | Friberg | 250/205 |
| 4,436,994 | 3/1984 | Van Vliet et al. | 250/207 |
| 4,507,379 | 3/1985 | Tsuchino et al. | 250/327.2 |
| 4,582,989 | 4/1986 | Agano | 250/351 |
| 4,616,267 | 10/1986 | Horikawa | 250/207 |

FOREIGN PATENT DOCUMENTS

| 147273 | 9/1983 | Japan | 250/327.2 |
| 147274 | 9/1983 | Japan | 250/327.2 |

Primary Examiner—Carolyn E. Fields
Attorney, Agent, or Firm—Sughrue, Mion, Zinn, Macpeak, and Seas

[57] ABSTRACT

A sheet carrying an image stored therein is scanned by a light beam emitted by a light source. Light which is obtained by the scanning of the sheet and which carries the image is detected by use of a photomultiplier. When the level of output current of the photomultiplier becomes higher than a predetermined standard level, the intensity of the light beam is decreased so that the level of the output current of the photomultiplier does not exceed the predetermined standard level, thereby preventing the photomultiplier from being broken by light of high intensity.

1 Claim, 1 Drawing Sheet

IMAGE SCANNING READ-OUT METHOD

This is a continuation of application Ser. No. 657,638 filed 10-4-84, now abandoned.

BACKGROUND OF THE INVENTION

1. Field of the Invention

This invention relates to an image scanning read-out method. This invention particularly relates to an image scanning read-out method for reading out an image stored in a sheet by two-dimensionally scanning the sheet by a light beam such as a laser beam and detecting light which is obtained by the scanning and which carries the image by use of a photomultiplier.

2. Description of the Prior Art

An image scanning read-out method using a photomultiplier has heretofore been used widely. In the method, a sheet carrying an image stored therein is two-dimensionally scanned by a light beam such as a laser beam, and then light (for example, light reflected by the sheet or light transmitted therethrough) which carries the image stored therein and which is obtained by the scanning is detected by use of a photomultiplier, thereby reading out the image.

The image scanning read-out method using a photomultiplier is employed, for example, in computer input apparatuses and image read-out apparatuses for facsimile machines. In the apparatus, image read-out is specifically carried out as described below.

A sheet carrying an image constituted by a density pattern stored therein, i.e. an original, is two-dimensionally scanned by a light beam. Light reflected by the original (in the case where the original is a paper original) or transmitted therethrough (in the case where the original is a film original) is detected and converted into a serial electric image signal by a photomultiplier. In this manner, the image carried in the original is read out. The electric image signal thus obtained is subjected to various processings, for example, transfer to a remote station via a transfer system, image processing, and storage in a magnetic recording medium.

The image scanning read-out method using a photomultiplier is employed also in a radiation image recording and reproducing system using a stimulable phosphor sheet as disclosed, for example, in U.S. Pat. No. 4,258,264 and Japanese Unexamined Patent Publication No. 56(1981)-11395. In this case, a stimulable phosphor sheet carrying a radiation image stored therein is exposed to stimulating rays which cause it to emit light in proportion to the radiation energy stored, and the emitted light is detected photoelectrically.

When certain kinds of phosphors are exposed to a radiation such as X-rays, α-rays, β-rays, γ-rays or ultraviolet rays, they store a part of the energy of the radiation. Then, when the phosphor which has been exposed to the radiation is exposed to stimulating rays such as visible light, light is emitted from the phosphor in proportion to the stored energy of the radiation. A phosphor exhibiting such properties is referred to as a stimulable phosphor.

In the radiation image recording and reproducing system using a stimulable phosphor sheet, image read-out is specifically carried out as described below.

A stimulable phosphor sheet carrying a radiation image stored therein by being exposed to a radiation such as X-rays via an object such as the human body is two-dimensionally scanned by stimulating rays such as a laser beam which cause it to emit light in proportion to the radiation energy stored. The emitted light is detected and converted into an electric image signal by a photomultiplier. In this manner, the radiation image is read out. On the basis of the electric image signal, a visible image is reproduced in a recording material such as a photographic material or on a display device such as a cathode ray tube (CRT).

However, in the image scanning read-out apparatus using a photomultiplier as a photodetector, a very serious problem arises as described below.

The photomultiplier is suitable for detecting very weak light. However, when the photomultiplier is exposed to strong light having an intensity such that the light is clearly visible to naked eyes with a voltage being applied thereto, an excessive photocurrent flows therethrough. When this condition continues, the photomultiplier breaks. Therefore, the image scanning read-out apparatus using the photomultiplier is generally constructed so that the inside of the apparatus is completely shielded from external light, thereby preventing the photomultiplier from breaking due to external light entering the apparatus.

However, in the aforesaid method of protecting the photomultiplier, it is not always possible to prevent the photomultiplier from breaking due to external light. Namely, in the case where shielding of the inside of the apparatus from external light is not complete due to faulty assembly or when a part of the apparatus opened for adjustment or maintenance is not closed after adjustment or maintenance is finished, the photomultiplier will easily break when operations of the apparatus are started and a voltage is applied to the photomultiplier. Since this problem actually arises very often and photomultipliers are expensive, the aforesaid method is very uneconomical.

The photomultiplier can be prevented from breaking also by stopping the application of a voltage thereto when the output current thereof exceeds a predetermined value. However, in this method, application of a voltage to the photomultiplier is stopped and image read-out is interrupted not only when external light enters the apparatus but also when the intensity of light which is reflected by a sheet carrying an image stored therein, or transmitted through the sheet, or emitted by the sheet upon stimulation thereof during exposure of the sheet to a light beam and which correctly represents the image becomes high. Therefore, it is not always possible to achieve image read-out continuously, and the method is not suitable for practical use.

SUMMARY OF THE INVENTION

The primary object of the present invention is to provide an image scanning read-out method using a photomultiplier wherein the photomultiplier is protected against high-intensity light representing an image during image read-out.

Another object of the present invention is to provide an image scanning read-out method which realizes continuous image read-out.

The present invention provides an image scanning read-out method for reading out an image stored in a sheet by scanning the sheet by a light beam emitted by a light source and detecting light which is obtained by the scanning of the sheet and which carries the image by use of a photomultiplier, wherein the improvement comprises the step of: when the output current level of said photomultiplier becomes higher than a predetermined standard level, decreasing the intensity of said light beam so that the output current level of said photomultiplier does not exceed the predetermined standard level.

In the present invention, the sheet carrying an image stored therein may be a paper original or a film original carrying an image constituted by a density pattern stored therein, or a stimulable phosphor sheet carrying a radiation image stored therein. The sheet may also be in any other form insofar as an image stored therein can be read out as light by scanning with a laser beam.

In order to decrease the intensity of the light beam, an acousto-optic modulator or an optical filter may be positioned on an optical path of the light beam. Or, a voltage supplied to the light source for emitting the light beam may directly be decreased.

As the predetermined standard level of the output current of the photomultiplier, a value not exceeding the rated current of the photomultiplier should preferably be selected. It is also possible to select the output current level of the photomultiplier, which corresponds to the light amount corresponding to the upper limit of the recording range of the image stored in the sheet. In the present invention, the step of decreasing the intensity of the light beam also embraces the case where the intensity thereof is reduced to zero.

In the present invention, the intensity of the light beam is controlled so that, when the output current level of the photomultiplier becomes higher than the predetermined standard level during scanning of a sheet by the light beam, the intensity of the light beam is decreased to make the output current of the photomultiplier not higher than the predetermined standard level. Therefore, even when high- 0 intensity light representing an image enters the photomultiplier during the scanning read-out, the photomultiplier does not break and image read-out is not interrupted. Thus it is possible to carry out image read-out continuously.

DESCRIPTION OF THE PREFERRED EMBODIMENTS

The present invention will hereinbelow be described in further detail with reference to the accompanying drawings.

Figure 1:
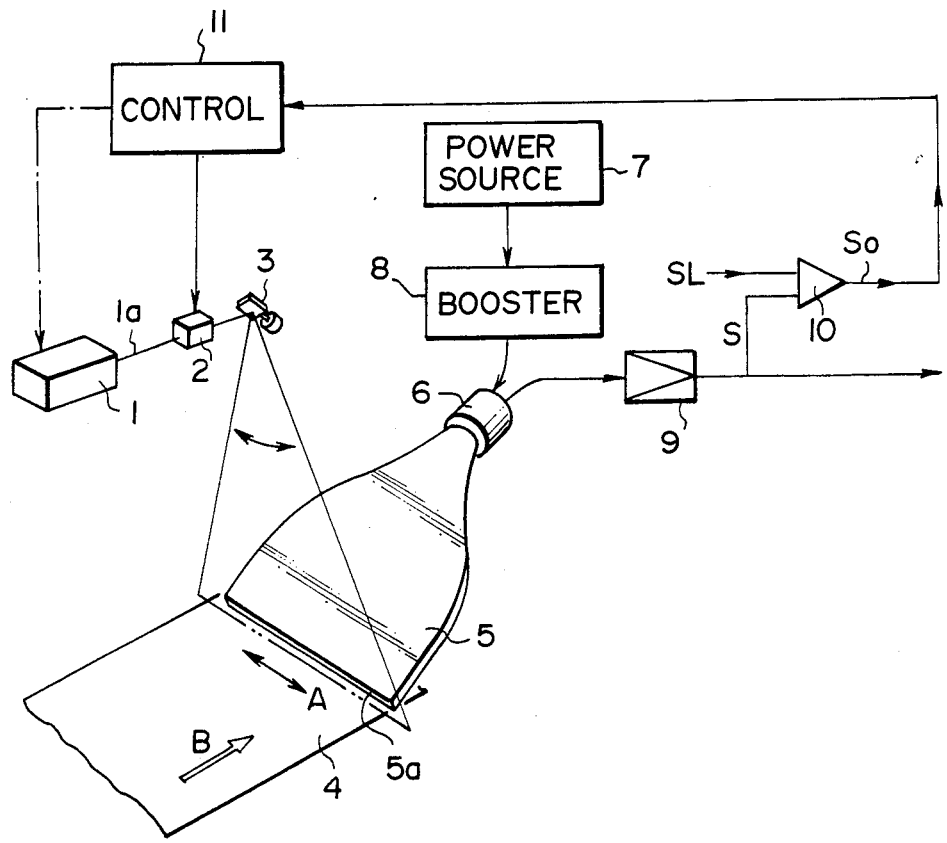
FIG. 1 is a schematic perspective view showing the apparatus for carrying out an embodiment of the image scanning read-out method in accordance with the present invention.

FIG. 1 shows a radiation image read-out apparatus using a stimulable phosphor sheet, wherein an embodiment of the image scanning read-out method in accordance with the present invention is employed. In this embodiment, image read-out is conducted as described below. A laser beam 1a emitted by a laser beam source 1 is passed through an acousto-optic modulator (AOM) 2 and is made by a galvanometer mirror 3 to impinge upon a stimulable phosphor sheet 4 carrying a radiation image stored therein so that the stimulable phosphor sheet 4 is scanned thereby in the main scanning direction as indicated by the arrow A. While the laser beam 1a impinges upon the stimulable phosphor sheet 4, the sheet 4 is moved in the sub-scanning direction as indicated by the arrow B. Thus the stimulable phosphor sheet 4 is two-dimensionally scanned by the laser beam 1a. As the stimulable phosphor sheet 4 is exposed to the laser beam 1a, light is emitted by the sheet 4 in proportion to the radiation energy stored. The emitted light enters a light guide member 5 from a light input face 5a thereof and is guided inside of the light guide member 5 up to a light receiving face of a photomultiplier 6. The light guide member 5 is fabricated of a transparent sheet material so that the light input face 5a thereof is linear and a light output face thereof has a ring-like shape matching the shape of the circular light receiving face of the photomultiplier 6. The light emitted by the stimulable phosphor sheet 4 and entering the light guide member 5 is guided from the linear light input face 5a to the ring-shaped light output face through total reflection.

Between the ring-shaped light output face of the light guide member 5 and the photomultiplier 6 is positioned a cut filter for transmitting only the light having the wavelength distribution of the light emitted by the stimulable phosphor sheet 4 and cutting off the light having the wavelength distribution of the laser beam 1a. The laser beam 1a has a wavelength distribution within the range of 600 nm to 700 nm so that it does not overlap the wavelength distribution of the light emitted by the stimulable phosphor sheet 4 within the range of 300 nm to 500 nm. The cut filter is a long-wavelength cut filter for cutting off the light having a wavelength longer than 500 nm. Therefore, the light emitted by the stimulable phosphor sheet 4 can be detected at a high SN ratio.

A voltage supplied by a power source 7 is boosted by a booster 8, and the high voltage thus obtained is applied to the photomultiplier 6.

The output current of the photomultiplier 6 is amplified by an amplifier 9 and is output to the outside. A part (output current S) of the current output by the amplifier 9 is sent to one terminal of a comparator 10 in which it is compared with a standard level SL input from the other terminal of the comparator 10. When the level of the output current S of the photomultiplier 6 is higher than the standard level SL, a signal So is generated by the comparator 10 and is sent to one terminal of a control circuit 11 for driving the AOM 2. The other terminal of the control circuit 11 is connected to the AOM 2 so that, when the level of the output current S of the photomultiplier 6 is higher than the standard level SL, the AOM 2 is activated to decrease the intensity of the laser beam 1a.

In the case where the laser beam source 1 is a semiconductor laser, it is also possible to achieve a decrease of the intensity of the laser beam 1a by decreasing the laser beam emission level of the laser beam source 1. In this case, for example, as indicated by the chain line in FIG. 1, the output of the control circuit 11 is sent to the laser beam source 1, and the output of the laser beam source 1 is controlled by the signal So generated by the comparator 10.

In the embodiment of FIG. 1, as the light carrying an image, the light emitted by the stimulable phosphor sheet 4 in proportion to the radiation energy stored is detected by the photomultiplier 6. In this case, an afterglow of the light emitted by the stimulable phosphor sheet 4 is also detected by the photomultiplier 6 and constitutes a noise component. However, in this embodiment, since the intensity of the laser beam 1a emitted by the laser beam source 1 is decreased, the level of the afterglow of the light emitted by the stimulable phosphor sheet 4 also decreases. Thus it becomes possible to reduce the noise component detected.

Figure 2:
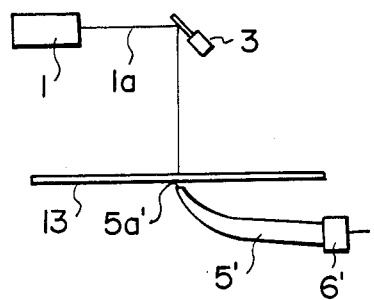
FIG. 2 is a schematic side view showing a part of the apparatus for carrying out another embodiment of the image scanning read-out method in accordance with the present invention.

FIG. 2 shows another embodiment of the image scanning read-out method in accordance with the present invention. When an image constituted by a density pattern stored in a film original is read out, it is necessary to read out the image by detecting light transmitted through the film original. In this case, as shown in FIG. 2, a light input face 5a' of a light guide member 5' is positioned at the back of a film original 13 along the scanning line of the laser beam 1a.

I claim:

1. An image scaning read-out method for reading out an image stored in a stimulable phosphor sheet by scanning the stimulable phosphor sheet by a light beam emitted by a semiconductor laser and detecting light emitted by said stimulable phosphor sheet upon stimulation thereof which is obtained by the scanning of the sheet, a photomultiplier enabling said emmitted light to carry the image wherein the improvement comprises the steps of:

setting a predetermined standard level for preventing an excessive photocurrent flow causing breakage of said photomultiplier; and when the output current level of said photomultiplier becomes instantaneously higher than said predetermined standard level, decreasing the current flowing through said semiconductor laser without turning off said current so that the output current level of said photomultiplier does not exceed the predetermined standard level.

* * * * *